(12) United States Patent
Kasahara et al.

(10) Patent No.: US 9,960,566 B2
(45) Date of Patent: May 1, 2018

(54) LASER OSCILLATION COOLING DEVICE

(71) Applicant: MITSUBISHI HEAVY INDUSTRIES, LTD., Tokyo (JP)

(72) Inventors: Jiro Kasahara, Tokyo (JP); Junnosuke Nakatani, Tokyo (JP); Yuichi Otani, Tokyo (JP); Naoki Inoue, Tokyo (JP); Koichi Hamamoto, Tokyo (JP); Shingo Nishikata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 15/550,896

(22) PCT Filed: Nov. 20, 2015

(86) PCT No.: PCT/JP2015/082705
§ 371 (c)(1),
(2) Date: Aug. 14, 2017

(87) PCT Pub. No.: WO2016/151940
PCT Pub. Date: Sep. 29, 2016

(65) Prior Publication Data
US 2018/0026416 A1 Jan. 25, 2018

(30) Foreign Application Priority Data

Mar. 20, 2015 (JP) .................................. 2015-057389

(51) Int. Cl.
*H01L 23/42* (2006.01)
*H01S 3/04* (2006.01)
(Continued)

(52) U.S. Cl.
CPC ............ *H01S 3/0407* (2013.01); *H01S 3/042* (2013.01); *H01S 3/091* (2013.01)

(58) Field of Classification Search
CPC ...... H01S 3/042; H01S 3/091; H01S 5/02423; H01S 3/0407
(Continued)

(56) References Cited

U.S. PATENT DOCUMENTS

| 6,195,372 B1* | 2/2001 | Brown | H01S 3/042 |
| | | | 372/34 |
| 6,240,111 B1 | 5/2001 | Kubota et al. | |
| 2003/0226371 A1* | 12/2003 | Rini | F28F 3/02 |
| | | | 62/310 |

FOREIGN PATENT DOCUMENTS

| EP | 3196990 | 7/2017 |
| JP | 10-190094 | 7/1998 |

(Continued)

OTHER PUBLICATIONS

International Search Report dated Feb. 9, 2016 in International Application No. PCT/JP2015/082705.

(Continued)

*Primary Examiner* — Tuan Nguyen
(74) *Attorney, Agent, or Firm* — Wenderoth, Lind & Ponack, L.L.P.

(57) ABSTRACT

A laser oscillation cooling device (100) includes a light emitting section (1) that emits laser excitation light (Z1), a laser excitation section (2) that excites the laser excitation light (Z1) to emit laser light (Z2) and has a heat generating region (S) where heat is locally generated, a storage tank (3) capable of storing an extremely low temperature liquid (L), a pressurizing section (31) that brings the extremely low temperature liquid (L) into a sub-cool state by pressurizing the inside of the storage tank (3), and a jetting supply section (4) that removes heat from the laser excitation section (2) by jetting the extremely low temperature liquid (L) in the sub-cool state from a plurality of jet ports arrayed in a two-dimensional manner to the laser excitation section (2).

7 Claims, 5 Drawing Sheets

(51) Int. Cl.
  *H01S 3/042* (2006.01)
  *H01S 3/091* (2006.01)
(58) Field of Classification Search
  USPC .................................. 372/35, 36, 52; 62/310
  See application file for complete search history.

(56) References Cited

FOREIGN PATENT DOCUMENTS

| | | |
|---|---|---|
| JP | 11-295772 | 10/1999 |
| JP | 2016-72346 | 5/2016 |

OTHER PUBLICATIONS

Written Opinion of the International Searching Authority dated Feb. 9, 2016 in International Application No. PCT/JP2015/082705.

* cited by examiner

LASER OSCILLATION COOLING DEVICE

TECHNICAL FIELD

The present invention relates to a laser oscillation cooling device.

This application claims the benefit of priority based on Japanese Patent Application No. 2015-057389, filed Mar. 20, 2015, the content of which is incorporated herein by reference.

BACKGROUND ART

In an apparatus, such as a laser machining apparatus, a solid-state laser that is represented by a semiconductor excitation solid-state laser is used as a light source. That is, laser oscillation is caused by exciting a solid-state laser medium through light reflection, thereby obtaining a laser light.

In the oscillation medium (medium) that oscillates laser in this way, it is known that the temperature of the medium increases with an increase in laser output. Furthermore, it is known that, when the medium is cooled, a laser oscillation limit is improved. Accordingly, cooling of the laser oscillation medium is required.

As a technique for cooling the laser oscillation medium, for example, a technique described in PTL 1 is known.

PTL 1 describes a laser light generation device. In this device, in order to remove heat generated from a laser excitation device (BBO crystal device) with the generation of laser light, a configuration in which a cryogen, such as liquid nitrogen, accumulated in a heat insulation container is supplied to a cold finger thermally connected to the BBO crystal device is employed.

CITATION LIST

Patent Literature

[PTL 1] Japanese Unexamined Patent Application Publication No. 11-295772

SUMMARY OF INVENTION

Technical Problem

However, since the oscillation limit of laser is substantially proportional to a cooling amount of the laser excitation device as the medium, in a case where the technique described in PTL 1 described above is used, if a laser output to a certain degree of more is attempted to be obtained, there is a possibility that cooling ability of the liquid nitrogen is insufficient. In particular, in the technique of PTL 1, the temperature of the liquid nitrogen increases to cause film boiling, and there is a possibility that cooling ability is not sufficiently obtained. In a case where cooling is not sufficient, the temperature of the medium increases and laser oscillation efficiency is degraded.

The invention has been accomplished in consideration of such a situation, and an object of the invention is to provide a laser oscillation cooling device having a sufficient cooling effect.

Solution to Problem

According to a first aspect of the invention, a laser oscillation cooling device includes a light emitting section that emits laser excitation light, a laser excitation section that excites the laser excitation light to emit laser light and has a heat generating region where heat is locally generated, a storage tank capable of storing an extremely low temperature liquid, a pressurizing section that brings the extremely low temperature liquid into a sub-cool state by pressurizing the inside of the storage tank, and a jetting supply section that removes heat from the laser excitation section by jetting the extremely low temperature liquid in the sub-cool state from a plurality of jet ports arrayed in a two-dimensional manner to the laser excitation section.

With the configuration described above, the extremely low temperature liquid is jetted from a plurality of arrayed jet ports. With this, in a case of cooling a comparatively large area, it is possible to reduce the amount of the used extremely low temperature liquid compared to a case where only one large-diameter jet port is provided.

The extremely low temperature liquid jetted to the laser excitation section forms a high-speed liquid film that flows at high speed along the surface of the laser excitation section. With this, it is possible to more effectively remove heat generated from the laser excitation section.

According to a second aspect of the invention, in the laser oscillation cooling device according to the first aspect, when viewed from a jetting direction of the extremely low temperature liquid, the plurality of jet ports may form an array group arrayed at intervals in a first direction orthogonal to the jetting direction, and a plurality of array groups may be provided at intervals in a second direction orthogonal to the first direction.

With the configuration described above, it is possible to substantially uniformize the thickness of the high-speed liquid film of the extremely low temperature liquid formed on the surface of the laser excitation section over the entire surface.

According to a third aspect of the invention, in the laser oscillation cooling device according to the second aspect, among the jet ports in a pair of array groups adjacent to each other in the second direction, the jet ports of one array group and the jet ports of the other array group may be provided at the same positions in the first direction.

With the configuration described above, it is possible to further uniformize the thickness of the high-speed liquid film of the extremely low temperature liquid formed on the surface of the laser excitation section over the entire surface.

According to a fourth aspect of the invention, in the laser oscillation cooling device according to the second aspect, among the jet ports in a pair of array groups adjacent to each other in the second direction, the jet ports of one array group and the jet ports of the other array group may be provided at different positions in the first direction.

With the configuration described above, it is possible to uniformize the thickness of the high-speed liquid film of the extremely low temperature liquid formed on the surface of the laser excitation section over the entire surface. In addition, with this configuration, it is possible to provide more jet ports within a plane having a constant area at high density.

According to a fifth aspect of the invention, in the laser oscillation cooling device according to any one of the first to fourth aspects, when an opening diameter of each of the jet ports is d, the distance between the jetting supply section and the laser excitation section is H, and the distance between two jet ports adjacent to each other is P, the relationships of Expressions (1) and (2) may be established.

$$3 \leq H/d \leq 7 \quad (1)$$

$$2 \leq P/d \leq 10 \quad (2)$$

With the configuration described above, it is possible to sufficiently cool the laser excitation section, and even in a case where an area of a region where heat has to be removed in the laser excitation section is widened, it is possible to suppress an increase in a necessary flow rate of the extremely low temperature liquid.

According to a sixth aspect of the invention, in the laser oscillation cooling device according to any one of the first to fifth aspects, among the plurality of jet ports, the jet ports relatively closer to the heat generating region of the laser excitation section may have a larger opening diameter, and the jet ports relatively farther from the heat generating region may have a smaller opening diameter.

According to the configuration described above, it is possible to jet intensively the extremely low temperature liquid to the heat generating region. With this, it is possible to more effectively remove heat from the laser excitation section.

According to a seventh aspect of the invention, in the laser oscillation cooling device according to any one of the first to sixth aspects, the jetting supply section may include a porous member that is disposed on an upstream side of the jet ports when viewed from a jetting direction of the extremely low temperature liquid and has a plurality of pore portions formed to pass through the porous member in the jetting direction.

According to the configuration described above, the extremely low temperature liquid passes through the pore portions of the porous member, whereby it is possible to uniformize the flow rate of the extremely low temperature liquid of each jet port.

Advantageous Effects of Invention

With the above-described laser oscillation cooling device, it is possible to obtain a sufficient cooling effect.

DESCRIPTION OF EMBODIMENTS

First Embodiment

Figure 1:
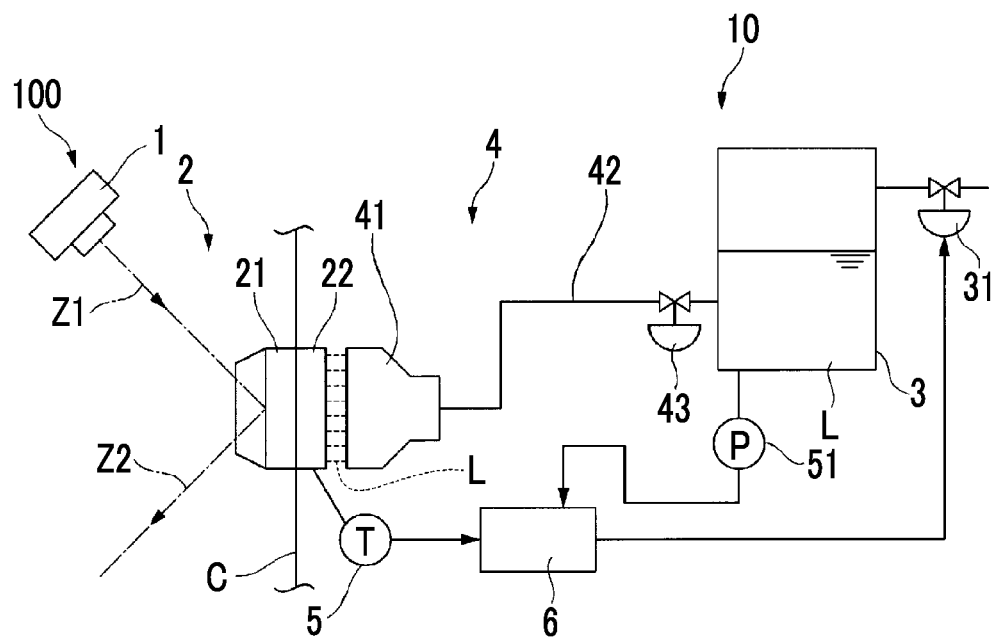
FIG. 1 is a schematic view showing a laser oscillation cooling device according to a first embodiment of the invention.

Hereinafter, a first embodiment of the invention will be described referring to the drawings.

As shown in FIG. 1, a laser oscillation cooling device 100 according to this embodiment is provided with a light emitting section 1 that emits laser excitation light Z1, a laser excitation section 2 that excites the incident laser excitation light Z1 to emit laser light Z2, a cooling section 10 that cools the laser excitation section 2, and a control section 6 that controls the operation of the cooling section 10.

(Laser Excitation Section)

The light emitting section 1 is provided at a position where the laser excitation section 2 can be irradiated with the laser excitation light Z1. The laser excitation section 2 has a medium section 21 that has, for example, sapphire or yttrium aluminum garnet (YAG) crystal, and a heat sink section 22 thermally connected to the medium section 21.

About several tens of % of the laser excitation light Z1 incident on the medium section 21 in the laser excitation section 2 are excited by a laser excitation medium and become the laser light Z2. The laser light Z2 is extracted to the outside and used, for example, for laser machining or the like.

While the laser light Z2 is obtained by the medium section 21 of the laser excitation section 2, components excluding the components extracted as the laser light Z2 are substantially converted to heat. Due to this heat, the laser excitation section 2 locally generates heat. As described above, since the heat sink section 22 is thermally connected to the medium section 21, heat generated in the medium section 21 is immediately transferred to the heat sink section 22.

In addition, the laser excitation section 2 is provided with a temperature measurement section 5. The temperature measurement section 5 is a device that measures and numeralizes the temperature of the medium section 21 in the laser excitation section 2. As the temperature measurement section 5, for example, a temperature sensor or the like is used.

At least a part (heat sink section 22) of the laser excitation section 2 configured in this manner is exposed to the inside of a cryostat C that is maintained in a cool state. That is, the laser excitation section 2 faces the inside and the outside of the cryostat C with a wall surface of the cryostat C interposed between.

In particular, a surface (heat sink section 22) facing the inside of the cryostat C is formed in a planar shape. In this embodiment, a case where a substantially uniform amount of heat is radiated over the entire heat sink section 22 will be described. That is, the entire heat sink section 22 according to this embodiment is a heat generating region S.

(Cooling Section)

The lower the temperature of the laser excitation medium, the higher an oscillation limit (maximum output: W) of laser excited by the laser excitation section 2. Accordingly, in order to cool the laser excitation section 2, the laser oscillation cooling device 100 according to this embodiment is provided with the cooling section 10. The cooling section 10 is a device that cools the laser excitation section 2 using an extremely low temperature liquid L. The cooling section 10 is provided with a storage tank 3 capable of storing the extremely low temperature liquid L, a pressurizing section 31 that pressurizes the inside of the storage tank 3, and a jetting supply section 4 that extracts the extremely low temperature liquid L in the storage tank 3 and supplies the extremely low temperature liquid L to the laser excitation section 2.

In this embodiment, an example where liquid nitrogen is used as the extremely low temperature liquid L is described. The storage tank 3 is a container capable of stably storing liquid nitrogen in a liquid-phase state. That is, the inside of the storage tank 3 is maintained at extremely low temperature. The pressure inside the storage tank 3 can be regulated by the pressurizing section 31. As the pressurizing section 31, a pressure valve connected to an external pressure supply source (not shown) is suitably used. In addition, the storage tank 3 is provided with a pressure measurement section 51 that measures the pressure inside thereof. As an example of the pressure measurement section 51, a pressure gauge, a pressure sensor, or the like capable of outputting a pressure value to the outside as an electric signal is exemplified.

Since the volume of the storage tank 3 is constant, the pressure inside the storage tank 3 is increased by the pressurizing section 31, thereby increasing the temperature of the extremely low temperature liquid L. On the contrary, the pressure inside the storage tank 3 is decreased, thereby decreasing the temperature of the extremely low temperature liquid L.

In particular, in the cooling section 10 according to this embodiment, the pressure inside the storage tank 3 is continued to be decreased by the pressurizing section 31, thereby maintaining the extremely low temperature liquid L inside the storage tank 3 in a sub-cool state.

For example, in a case where liquid nitrogen is used as the extremely low temperature liquid L, a saturation temperature of liquid nitrogen under atmospheric pressure is −196° C.; however, in a case where the extremely low temperature liquid L is in the sub-cool state, it is possible to maintain the saturation temperature at a value lower than −196° C. The pressure inside the storage tank 3 is regulated by the pressurizing section 31, thereby regulating a sub-cool degree of the extremely low temperature liquid L in the sub-cool state, that is, the difference from the saturation temperature.

The jetting supply section 4 is a device that jets the extremely low temperature liquid L to the heat sink section 22 of the laser excitation section 2. The jetting supply section 4 is provided with a jet nozzle 41 that jets the extremely low temperature liquid L, a supply pipe 42 that connects the jet nozzle 41 and the storage tank 3, and a flow rate regulating section 43 provided in the middle of the supply pipe 42.

In a tip portion of the jet nozzle 41, a plurality of jet ports 416 are arranged in a two-dimensional manner. The extremely low temperature liquid L supplied from the storage tank 3 to the jet nozzle 41 through the supply pipe 42 is jetted to the outside through the jet ports 416. The flow rate of the extremely low temperature liquid L jetted from the jet nozzle 41 can be regulated by the flow rate regulating section 43. As the flow rate regulating section 43, for example, a valve, such as a throttle valve or a flow rate regulating valve, capable of regulating an opening is suitably used.

In the following description, a direction in which the extremely low temperature liquid L is jetted from the jet nozzle 41 is referred to as a jetting direction. In the jetting direction, a side where the extremely low temperature liquid L flows is referred to as an upstream side, and a side (a side where the extremely low temperature liquid L flows away) opposite to the upstream side is referred to as a downstream side.

Figure 3:
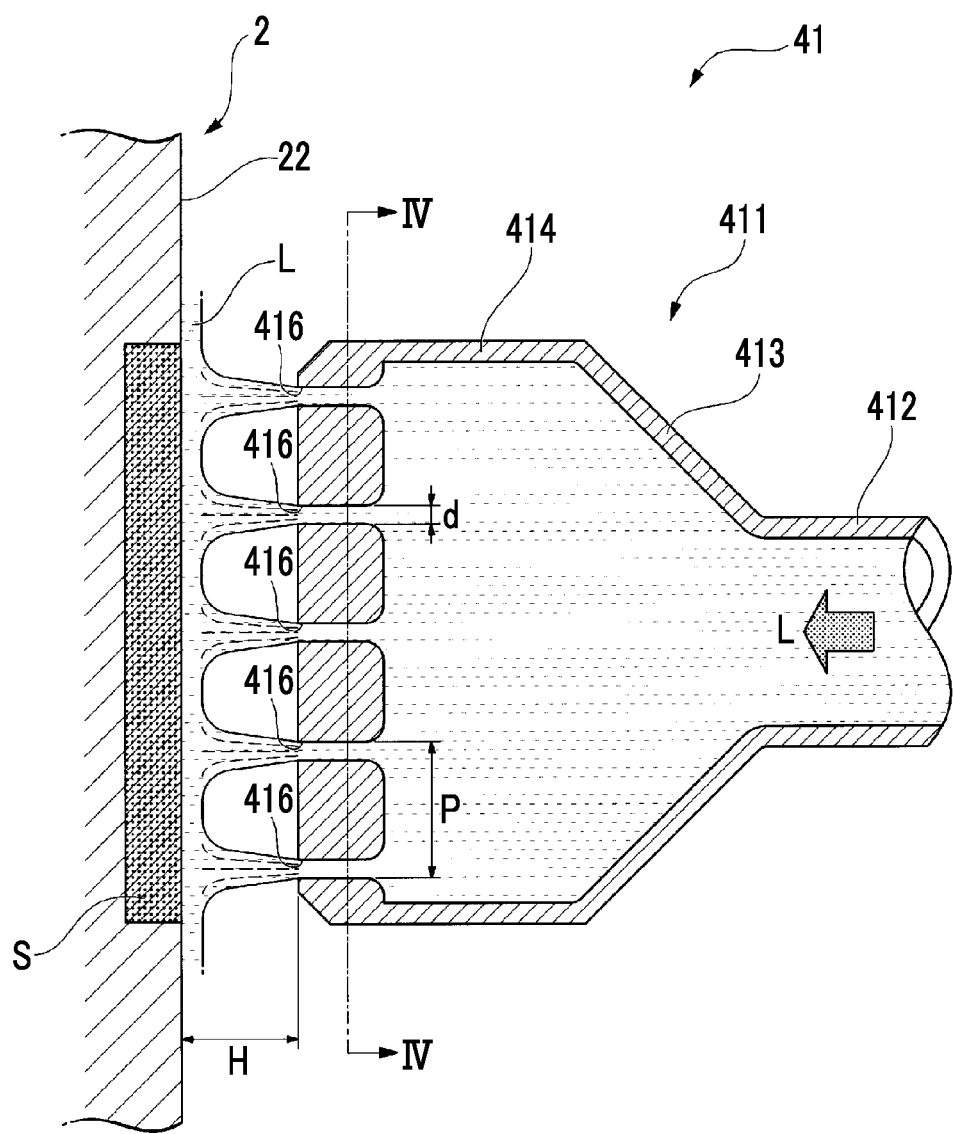
FIG. 3 is a sectional view of a jetting supply section according to the first embodiment of the invention.
Figure 4:
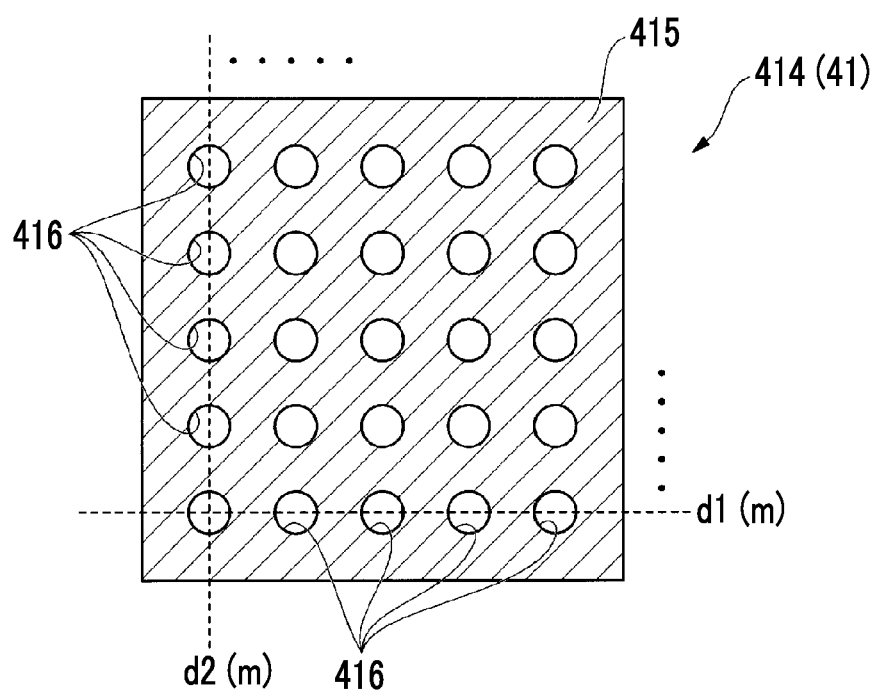
FIG. 4 is a sectional view taken along the line IV-IV of FIG. 3.

Next, the detailed configuration of the jet nozzle 41 will be described referring to FIGS. 3 and 4. As shown in FIG. 3, the jet nozzle 41 according to this embodiment is connected to the supply pipe 42 and has a plurality of jet ports 416 formed on a surface (jetting surface 415) facing the laser excitation section 2 (heat sink section 22).

A nozzle body 411 has a connecting portion 412 that is connected to an end portion of the supply pipe 42, and an enlarged diameter portion 413 and a jetting portion 414 that are integrally provided on a downstream side of the connecting portion 412. All of the connecting portion 412, the enlarged diameter portion 413, and the jetting portion 414 have a tubular shape, and form flow channels, through which the extremely low temperature liquid L flows, inside thereof.

An end portion on an upstream side of the enlarged diameter portion 413 communicates with an end portion on a downstream side of the connecting portion 412. The opening dimension (flow channel cross-sectional area) of the enlarged diameter portion 413 gradually increases from the upstream side toward the downstream side. In other words, the enlarged diameter portion 413 substantially has a funnel shape.

The jetting portion 414 is provided integrally on a downstream side of the enlarged diameter portion 413, and has a plurality of jet ports 416 having a comparatively small diameter formed on the jetting surface 415 as a surface on a downstream side. In this embodiment, the jetting surface 415 spreads on a two-dimensional plane substantially in parallel with the heat sink section 22. In other words, the heat sink section 22 and the jetting surface 415 are separated from each other at a given distance over the entire spreading surface direction of the heat sink section 22 (or the jetting surface 415).

With the above-described configuration, the extremely low temperature liquid L that flows into the jet nozzle 41 through the supply pipe 42 is jetted from a plurality of jet ports 416 toward the outside by way of the connecting portion 412, the enlarged diameter portion 413, and the jetting portion 414 that communicate with one another. The number of jet ports 416 or the opening shape of each jet port 416 is suitably determined according to the area of the laser excitation section 2, from which heat is to be removed.

Subsequently, the arrangement of a plurality of jet ports 416 will be described referring to FIG. 4. As shown in the drawing, in this embodiment, the jetting surface 415 substantially has a rectangular shape. The shape of the jetting surface 415 may be suitably determined according to the external shape of the laser excitation section 2. When viewed from the downstream side of the jetting direction, a plurality of jet ports 416 are arrayed in a lattice shape on the jetting surface 415.

In more detail, on the jetting surface 415 having a rectangular shape, a part of a plurality of jet ports 416 forms a group (array group m) arrayed at intervals in a specific direction (first direction d1).

A plurality of array groups m are provided at intervals in a direction (second direction d2) orthogonal to the first direction d1.

In particular, in this embodiment, among the jet ports 416 in a pair of array groups m adjacent to each other among the array groups m, the positions of the jet port 416 of one array group m and the jet ports 416 of the other array group m are identical in the first direction d1. That is, a plurality of jet ports 416 are arrayed in a lattice shape on the jetting surface 415. The term "identical" used herein does not necessarily mean completely identical, and an error due to machining or the like is permitted.

The dimension of each portion in a plurality of jet ports 416 is set such that the following conditions are satisfied. Specifically, when an opening diameter of each of the jet ports 416 is d, the distance between the jetting surface 415 and the heat sink section 22 is H, and the distance between two jet ports 416 adjacent to each other is P, the relationships of Expressions (1) and (2) are established.

$$3 \leq H/d \leq 7 \quad (1)$$

$$2 \leq P/d \leq 10 \quad (2)$$

In particular, it is most desirable that the value of P/d is set to be equal to or greater than 2 or less than 5 within a numerical value range (equal to or greater than 2 or less than 10) shown in Expression (2).

(Control Section)

Figure 2:
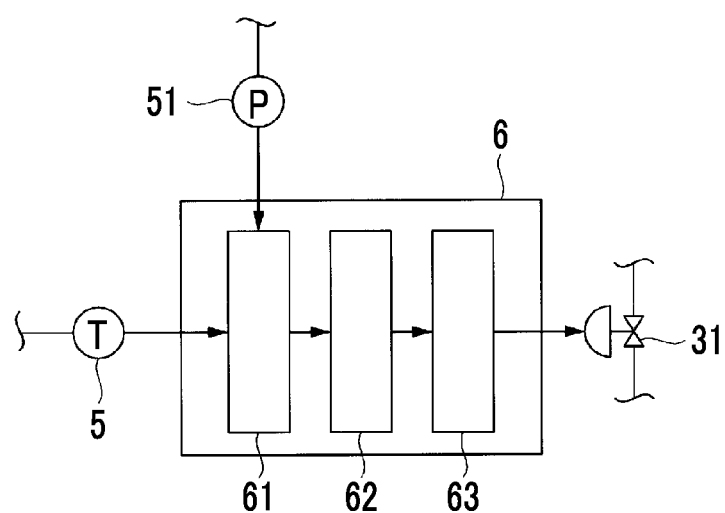
FIG. 2 is a diagram showing the configuration of a control section according to the first embodiment of the invention.

The control section 6 is a device that regulates the sub-cool degree of the extremely low temperature liquid L according to the temperature of the laser excitation section 2 and obtaining an optimum cooling effect. As shown in FIG. 2, the control section 6 has an input storage section 61 that receives various measurement values as electric signals from the outside as input and stores data to be compared with the measurement values, a calculation section 62 that performs calculation based on input values input to the input storage section 61, and an instruction section 63 that outputs an instruction value to the outside based on the calculation value output from the calculation section 62.

The sub-cool degree of the extremely low temperature liquid L can be changed by regulating the pressure inside the storage tank 3. For example, in a case where the pressure inside the storage tank 3 is increased, it is possible to increase the sub-cool degree of the extremely low temperature liquid L. In a case where the pressure inside the storage tank 3 is decreased, it is possible to decrease the sub-cool degree of the extremely low temperature liquid L.

In addition, the higher the sub-cool degree of the extremely low temperature liquid L for cooling the laser excitation section 2, the larger a critical heat flux of the extremely low temperature liquid L. That is, the higher the sub-cool degree, the further a laser oscillation limit value in the laser excitation section 2 is improved. Accordingly, in a case where a laser output having a certain value is obtained, there is a minimum sub-cool degree (target sub-cool degree) required for maintaining the laser output.

In the control section 6 according to this embodiment, the calculation section 62 calculates the required target sub-cool degree based on the laser output measured as a temperature value, the instruction section 63 sends an instruction signal to the pressurizing section 31 for the target sub-cool degree, and the pressure inside the storage tank 3 is regulated. That is, in this case, the control section 6 is operated as a device that changes the sub-cool degree of the extremely low temperature liquid L by regulating a pressurizing force of the pressurizing section 31.

According to the configuration described above, the extremely low temperature liquid L is jetted from each of a plurality of arrayed jet ports 416. With this, in a case of cooling a comparatively large area, for example, it is possible to reduce the amount of the extremely low temperature liquid L to be used compared to a case where only one large-diameter jet port 416 is provided.

In other words, according to the above-described configuration, it is possible to reduce the amount (surplus amount) of the extremely low temperature liquid L that is not used to cool the laser excitation section 2 and flows away, and to optimize cooling ability (amount of heat to be removed) per unit flow rate.

The extremely low temperature liquid L jetted to the laser excitation section 2 forms a high-speed liquid film that flows at high speed along the surface of the laser excitation section 2. Specifically, as shown in FIG. 2 or the like, the jet flow of the extremely low temperature liquid L jetted from each jet port 416 collides against the heat sink section 22 to flow along the surface of the heat sink section 22 and to form the high-speed liquid film. That is, on the surface of the heat sink section 22, the extremely low temperature liquid L that flows at high speed is in a film shape and heat exchange is performed ordinarily. With this, it is possible to more effectively remove heat from the laser excitation section 2.

As described above, in this embodiment, since the high-speed liquid film is formed of the extremely low temperature liquid L in the sub-cool state, nucleate boiling is maintained in the extremely low temperature liquid L. In other words, a possibility that film boiling occurs in the extremely low temperature liquid L is reduced. With this, since excessive evaporation of the extremely low temperature liquid L is suppressed, it is possible to obtain sufficient cooling ability to the laser excitation section 2.

In this embodiment, a plurality of jet ports 416 form the array group m arrayed at intervals in the first direction d1 orthogonal to the jetting direction when viewed from the jetting direction of the extremely low temperature liquid L, and a plurality of array groups m are provided at intervals in the second direction d2 orthogonal to the first direction d1. That is, a plurality of jet ports 416 are provided in a lattice shape on the jetting surface 415.

According to the configuration described above, it is possible to substantially uniformize the thickness of the high-speed liquid film of the extremely low temperature liquid L on the surface (on the heat sink section 22) of the laser excitation section 2 over the entire surface. With this, it is possible to suppress deviation in the amount of heat to be removed in the heat sink section 22.

In this embodiment, the dimension of a plurality of jet ports 416 is set such that the relationships shown in Expressions (1) and (2) are satisfied.

As in this embodiment, it is known that the cooling characteristic (cooling ability) of a heat generating element (laser excitation section 2) with the jet flow of the extremely low temperature liquid L becomes larger when the flow rate of the extremely low temperature liquid L is higher. In particular, it is known that the value of P/d is a dominant index in optimizing a flux of the extremely low temperature liquid L in the jet port 416. For example, in a case where the value of P/d is set outside the range of Expression (2), the flux of the extremely low temperature liquid L decreases, and there is a possibility that it is not possible to sufficiently secure cooling ability to the laser excitation section 2. However, in this embodiment, the above-described conditions are satisfied, whereby it is possible to maximize the flux of the extremely low temperature liquid L.

According to such a configuration, it is possible to sufficiently cool the laser excitation section 2, and even in a case where an area of a region where heat has to be removed in the laser excitation section 2 spreads, it is possible to suppress an increase in a required flow rate of the extremely low temperature liquid L.

That is, with the use of the jet nozzle 41 that satisfy the relationships of the above-described conditions (Expressions (1) and (2)), it is possible to achieve both maximization of the flux of the extremely low temperature liquid L and reduction in the amount of the extremely low temperature liquid L to be used, whereby it is possible to obtain sufficiently satisfactory cooling ability.

The first embodiment of the invention has been described above referring to the drawings. However, the above-described embodiment is merely an example, and various modifications or alterations may be made without departing from the spirit of the invention.

For example, in the above-described embodiment, an example where the jetting surface 415 is substantially formed in a rectangular shape has been described. However, the shape of the jetting surface 415 is not limited to a rectangular shape, and may be a circular shape or an elliptical shape or may be a triangular shape or a pentagonal shape. In summary, the shape of the jetting surface 415 may be arbitrarily determined as long as the jetting surface 415 can cover the entire laser excitation section 2 (heat sink section 22) facing the jetting surface 415.

Second Embodiment

Figure 5:
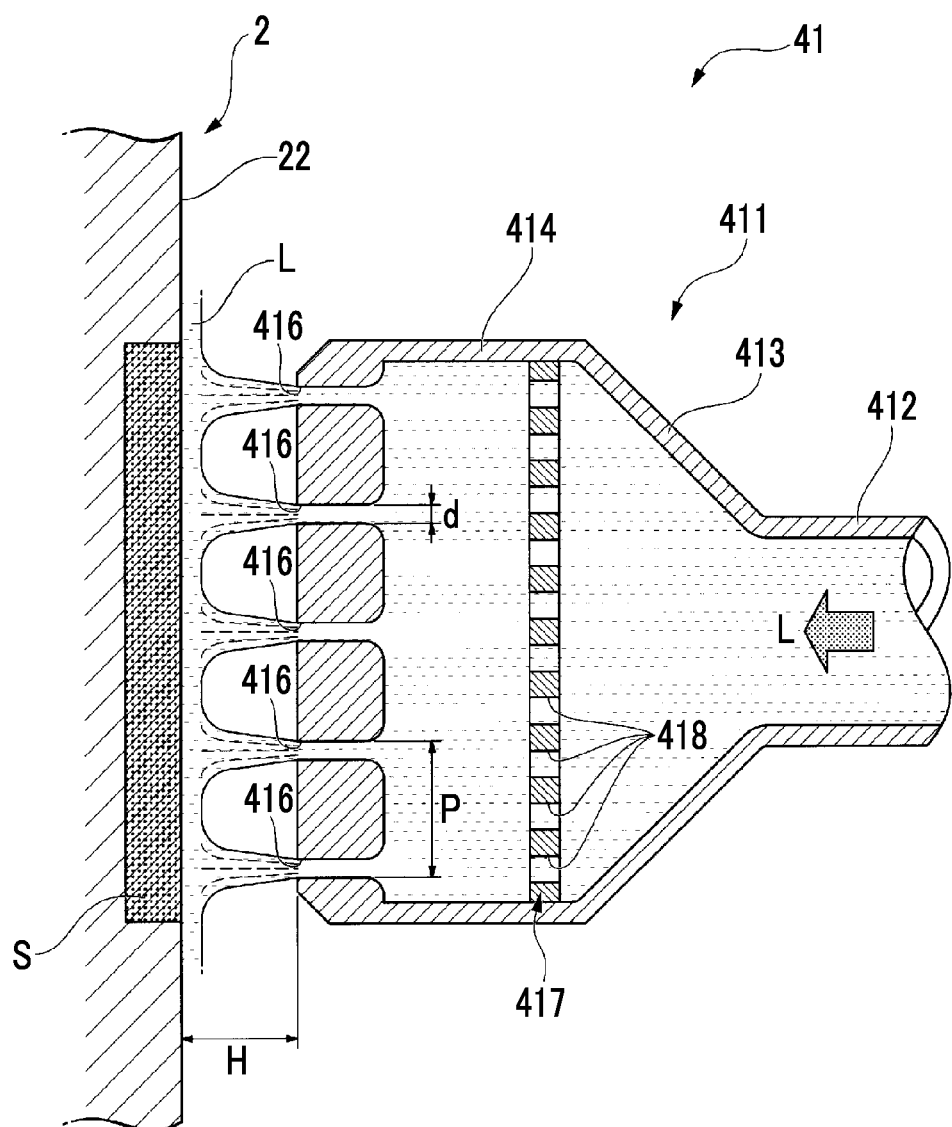
FIG. 5 is a sectional view of a jetting supply section according to a second embodiment of the invention.

Next, a second embodiment of the invention will be described referring to FIG. 5. The same configurations or members as those in the first embodiment are represented by the same reference numerals, and detailed description thereof will not be repeated. As shown in the drawing, in a laser oscillation cooling device 100 according to this embodiment, a porous member 417 is provided inside the jet nozzle 41. In more detail, the porous member 417 is a substantially plate-shaped member that is provided within an interface between the enlarged diameter portion 413 and the jetting portion 414.

In the porous member 417, a plurality of pore portions 418 that pass through the porous member 417 in the jetting direction of the extremely low temperature liquid L are formed. A plurality of pore portions 418 have the same shape and dimension. In this embodiment, all of the pore portions 418 have a substantially circular cross-sectional shape (a cross-sectional shape in the jetting direction).

With the configuration described above, the extremely low temperature liquid L that flows by way of the connecting portion 412 and the enlarged diameter portion 413 retains in a region (that is, the inside of the enlarged diameter portion 413) on an upstream side of the porous member 417 for a given time, and then, passes through the pore portions 418 of the porous member 417. With this, the extremely low temperature liquid L in a region (that is, the inside of the jetting portion 414) on a downstream side of the porous member 417 is rectified. In other words, it is possible to uniformize the flow rate of the extremely low temperature liquid L over the substantially entire extending region of the porous member 417. With this, since it is possible to uniformize the flow rate of the extremely low temperature liquid L jetted from each jet port 416, it is possible to reduce a possibility that nonuniformity occurs in the amount of heat to be removed on the heat sink section 22.

Third Embodiment

Figure 6:
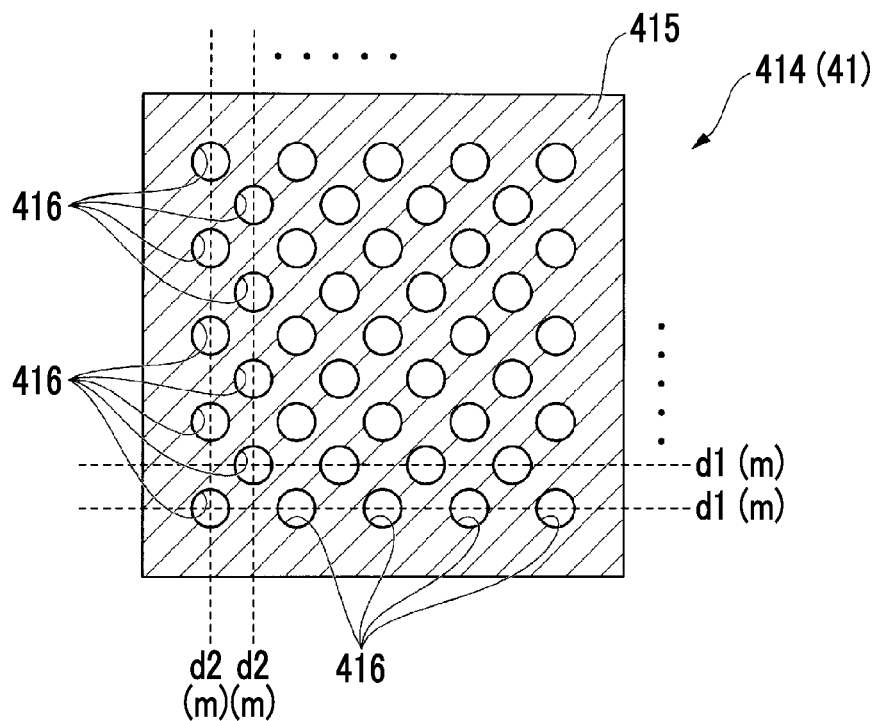
FIG. 6 is a diagram showing the arrangement of jet ports of a jetting supply section according to a third embodiment of the invention.

Subsequently, a third embodiment of the invention will be described referring to FIG. 6. The same configurations or members as those in the above-described embodiments are represented by the same reference numerals, and detailed description will not be repeated. As shown in the drawing, in a laser oscillation cooling device 100 according to this embodiment, the arrangement of a plurality of jet ports 416 is different from that in the above-described embodiments.

Specifically, in this embodiment, the positions of the jet ports 416 in one array group m out of a pair of array groups m of the jet ports 416 adjacent to each other and the positions of the jet ports 416 in the other array group m are different in the first direction d1. In other words, a plurality of jet ports 416 are arrayed in zigzag (staggered) on the jetting surface 415.

According to such a configuration, it is possible to further uniformize the thickness of the high-speed liquid film of the extremely low temperature liquid L formed on the surface of the laser excitation section 2 over the entire surface. According to such a configuration, it is possible to provide more jet ports 416 at high density within a plane having a given area.

Therefore, it is possible to further increase the amount of heat to be removed in the heat sink section 22, and to suppress an increase in the amount of the extremely low temperature liquid L to be used.

For a plurality of jet ports 416 in this embodiment, it is possible to set the dimensions such that the conditions of Expressions (1) and (2) are satisfied.

The porous member 417 described in the second embodiment may be provided to the jet nozzle 41 in this embodiment. With this, it is possible to reduce a possibility that nonuniformity occurs in the amount of heat to be removed on the heat sink section 22.

Fourth Embodiment

A fourth embodiment of the invention will be described referring to FIG. 7. The same configurations or members as those in the above-described embodiments are represented by the same reference numerals, and detailed description will not be repeated. As shown in the drawing, in a laser oscillation cooling device 100 according to this embodiment, the distribution of the amount of heat generated in the laser excitation section 2 and the arrangement of a plurality of jet ports 416 are different from those in the above-described embodiments.

In detail, in this embodiment, the amount of heat generated in a partial region out of the heat sink section 22 in the laser excitation section 2 is relatively higher than the remaining region. That is, in this embodiment, out of a rectangular region of the heat sink section 22, a central region including the center of the rectangular region is the heat generating region S.

In the jet nozzle 41 according to this embodiment, among a plurality of jet ports 416, the jet ports 416 relatively closer to the heat generating region S have a larger opening diameter, and the jet ports 416 relatively farther from the heat generating region S have a smaller opening diameter. Specifically, in a region that overlaps the heat generating region S when viewed from the jetting direction, the opening diameter of each of the jet ports 416 is set to be relatively large. In a region that overlaps a region excluding the heat generating region S on the jetting surface 415, the opening diameter of each of the jet ports 416 is set to be relatively small.

According to such a configuration, a relatively large amount of extremely low temperature liquid L is jetted from the jet ports 416 facing the heat generating region S. That is, it is possible to intensively jet a larger amount of extremely low temperature liquid L to the heat generating region S. With this, it is possible to further uniformize a temperature distribution in the heat sink section 22 of the laser excitation section 2.

In particular, in a case where the heat generating region S of the laser excitation section 2 is specified in advance, with the above-described configuration, it is possible to control the amount of heat to be removed in the laser excitation section 2 with higher accuracy.

The porous member 417 described in the second embodiment may be provided to the jet nozzle 41 in this embodiment. With this, it is possible to reduce a possibility that nonuniformity occurs in the amount of heat to be removed on the heat sink section 22.

Figure 7:
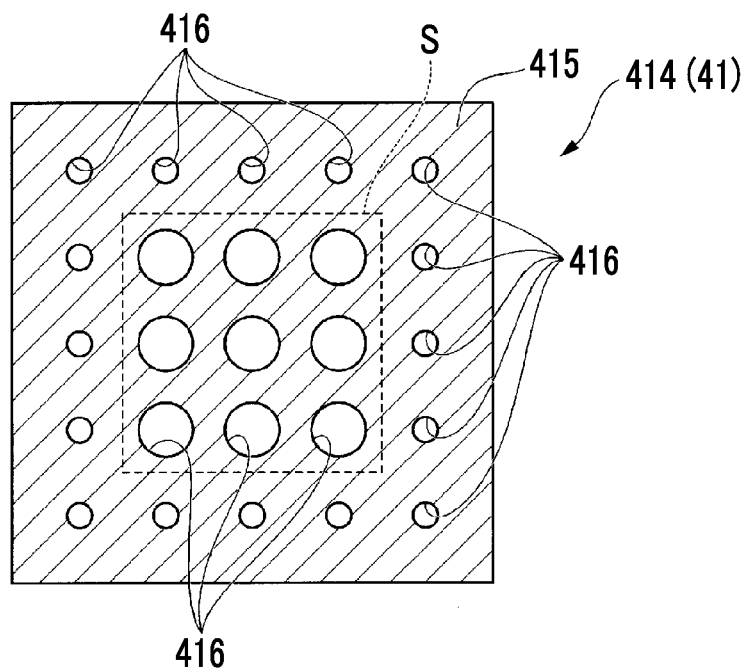
FIG. 7 is a diagram showing the arrangement of jet ports of a jetting supply section according to a fourth embodiment of the invention.

In the above-described embodiments and the example of FIG. 7, a configuration in which the opening diameters of the jet ports 416 facing the heat generating region S are identical to each other has been described. However, the opening diameters of the jet ports 416 may not be identical to each other even within the heat generating region S, and the jet ports 416 may be formed such that the opening diameter gradually decreases or decreases from the central portion of the heat generating region S toward an edge portion. That is, in a case where a more microscopic temperature distribution is obtained in advance within the heat generating region S, it is desirable that the opening diameter of each of the jet ports 416 is set corresponding to the temperature distribution. Specifically, it is desirable that the opening diameter of each of the jet ports 416 facing a region where the temperature is relatively high is set to be relatively large, and conversely, the opening diameter of each of the jet ports 416 facing a region where the temperature is relatively low is set to be relatively small.

With the configuration described above, it is possible to uniformize the temperature distribution in the heat sink section 22 with higher accuracy.

INDUSTRIAL APPLICABILITY

According to the laser oscillation cooling device configured as above, it is possible to obtain a sufficient cooling effect.

REFERENCE SIGNS LIST

1: light emitting section
2: laser excitation section
3: storage tank
4: jetting supply section
5: temperature measurement section
6: control section
10: cooling section
21: medium section
22: heat sink section
31: pressurizing section
41: jet nozzle
42: supply pipe
43: flow rate regulating section
44: flow rate measurement section
51: pressure measurement section
61: input storage section
62: calculation section
63: instruction section
100: laser oscillation cooling device
411: nozzle body
412: connecting portion
413: enlarged diameter portion
414: jetting portion
415: jetting surface
416: jet port
417: porous member
418: pore portion
C: cryostat
d1: first direction
d2: second direction
L: extremely low temperature liquid
m: array group
S: heat generating region
Z1: laser excitation light
Z2: laser light

The invention claimed is:

1. A laser oscillation cooling device comprising:
a light emitting section that emits laser excitation light;
a laser excitation section that excites the laser excitation light to emit laser light and has a heat generating region where heat is locally generated;
a storage tank capable of storing an extremely low temperature liquid;
a pressurizing section that brings the extremely low temperature liquid into a sub-cool state by pressurizing the inside of the storage tank; and
a jetting supply section that removes heat from the laser excitation section by jetting the extremely low temperature liquid in the sub-cool state from a plurality of jet ports arrayed in a two-dimensional manner to the laser excitation section.

2. The laser oscillation cooling device according to claim 1,
wherein, when viewed from a jetting direction of the extremely low temperature liquid, the plurality of jet ports form an array group arrayed at intervals in a first direction orthogonal to the jetting direction, and
a plurality of array groups are provided at intervals in a second direction orthogonal to the first direction.

3. The laser oscillation cooling device according to claim 2,
wherein, among the jet ports in a pair of array groups adjacent to each other in the second direction, the jet ports of one array group and the jet ports of the other array group are provided at the same positions in the first direction.

4. The laser oscillation cooling device according to claim 2,
wherein, among the jet ports in a pair of array groups adjacent to each other in the second direction, the jet ports of one array group and the jet ports of the other array group are provided at different positions in the first direction.

5. The laser oscillation cooling device according to claim 1,
wherein, when an opening diameter of each of the jet ports is d, the distance between the jetting supply section and the laser excitation section is H, and the distance between two jet ports adjacent to each other is P, the relationships of Expressions (1) and (2) are established, $$3 \leq H/d \leq 7 \quad (1)$$

$$2 \leq P/d \leq 10 \quad (2).$$

6. The laser oscillation cooling device according to claim 1,
wherein, among the plurality of jet ports, the jet ports relatively closer to the heat generating region of the laser excitation section have a larger opening diameter, and the jet ports relatively farther from the heat generating region have a smaller opening diameter.

7. The laser oscillation cooling device according to claim 1,
wherein the jetting supply section includes
a porous member that is disposed on an upstream side of the jet ports when viewed from a jetting direction of the extremely low temperature liquid and has a plurality of pore portions formed to pass through the porous member in the jetting direction.

* * * * *